INVENTOR
Lillian L. Greneker

July 11, 1939.   L. L. GRENEKER   2,165,474
ORNAMENTAL DISPLAY DEVICE
Filed Dec. 1, 1937   2 Sheets-Sheet 2
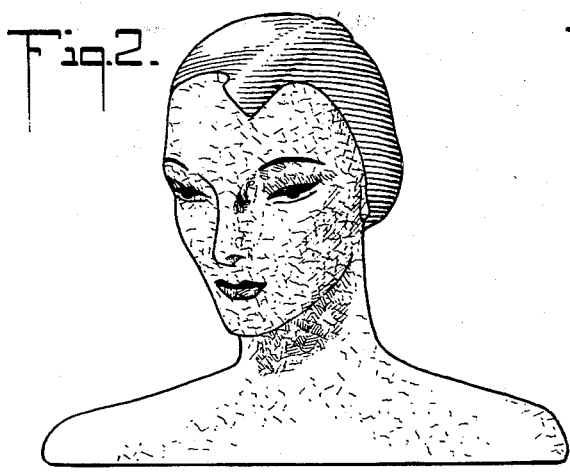
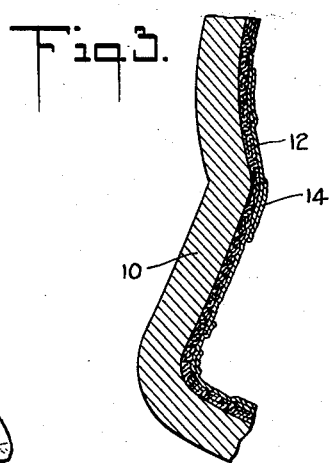
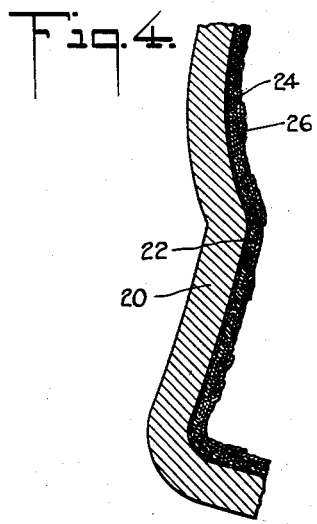
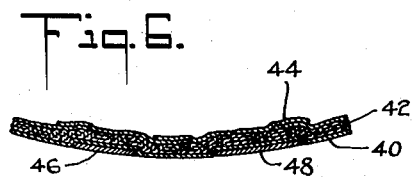
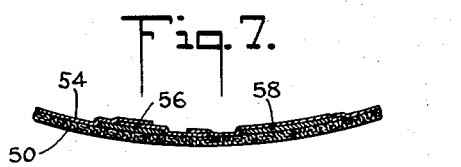
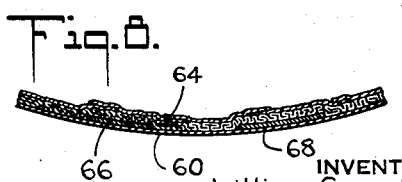
INVENTOR
Lillian Greneker
BY
*Gluck + Breitenfeld*
ATTORNEYS Patented July 11, 1939

2,165,474

UNITED STATES PATENT OFFICE 2,165,474

ORNAMENTAL DISPLAY DEVICE

Lillian L. Greneker, New York, N. Y.

Application December 1, 1937, Serial No. 177,506

5 Claims. (Cl. 41—22)

My present invention relates generally to ornamentation, and has particular reference to ornamental display devices.

My invention is of particular utility in connection with the manufacture of display devices intended for use in show windows and the like, but it is to be understood that certain phases of my invention are by no means restricted to any such specific use.

It is a general object of the invention to provide a display device composed in its entirety of sheet material such as paper, regenerated cellulose, and the like; a structure of the present character being characterized by its extreme lightness in weight and by economy and ease of manufacture.

One of the more important objects of my invention is to provide a display device having a uniquely novel ornamental appearance. More particularly, I aim to provide a device whose wall structure is of novel laminated character, producing a new and strikingly attractive ornamental appearance.

It is a feature of my invention to provide, in a display device, a laminated wall structure at least one of the layers of which is crinkled sheet material, the term "crinkled" being intended to refer to any wrinkling, creasing, or deformation of conspicuously irregular character. As a result of such crinkling, the surface of the layer is broken up into small areas arranged at haphazard angles to one another, whereby light reflected from or refracted through the crinkled layer will be dispersed in various directions, thereby producing an unusually attractive ornamental effect.

A particular feature of my invention lies in the association of parts whereby the wall structure becomes entirely self-supporting, notwithstanding the fact that there is a complete absence of any relatively rigid supporting body or structure.

In one embodiment of the invention, the wall structure comprises a layer of crinkled sheet material in superposed relation to a reinforcing layer composed of patches or pieces of uncrinkled sheet material, such as paper. The crinkled layer may be either opaque or light-transmitting in character, and in the latter case the underlying reinforcing layer may, itself, be either of an opaque or a light-transmitting type.

In another embodiment, the foregoing assembly of layers is associated with a third outer layer of light-transmitting sheet material which is relatively smooth and uncrinkled. Such an outer layer may, for example, be composed of regenerated cellulose, such as "cellophane".

Where the crinkled layer is of light-transmitting character it, too, may advantageously be composed of regenerated cellulose.

In certain modified constructions, the ornamental appearance of the device is further augmented by the use of ornamental pieces of contrasting material of limited areas, preferably configured in an ornamental manner, these additional pieces being arranged either on the outside or the under side of the crinkled paper, depending upon the effect desired.

I achieve the foregoing objects, and such other objects as may hereinafter appear or be pointed out, in the manner illustratively exemplified in the accompanying drawings, wherein—

Figure 2 illustrates the application of my invention to a display device in the form of a bust;

Figure 3 illustrates one embodiment of my invention and the method of producing the same;

Figure 4 illustrates another embodiment of my invention and the method of producing the same;

Figure 5 is illustrative of another embodiment of my invention;

Figure 6 shows a fragmentary transverse section through the wall of a display device such as shown in Figure 5, and illustrates a further embodiment of my invention;

Figure 7 shows a fragmentary transverse section through the wall of a display device such as shown in Figure 5, and illustrates a modified construction;

Figure 8 shows a fragmentary transverse section through the wall of a display device such as shown in Figure 5, and illustrates a further modification; and Figure 9 is a transverse sectional view taken through a sheet of material embodying my invention and which may be used for the walls of display devices.

Figure 1:
Figure 1 shows the application of my invention to a display device in the form of a hand.

In Figure 1 I have illustratively shown a display device constructed in accordance with the present invention and conforming to the contour of a human hand. A device of this character might, for example, be employed in a store window to support various commodities on display. The device may be of any desired size and, in accordance with my invention, the structure is so extremely light and inexpensive to manufacture that a hand of the character shown in Figure 1 may, for example, be several feet in length. In Figure 1, the unique ornamental effect of the present invention is illustratively exemplified, although it will be understood that it is impossible in a black and white illustration to do full justice to the true ornamental effect that is produced, particularly where the display device is made of light-transmitting material and illuminated either from the front, from the rear, or from the interior of the device itself. However, the breaking up of the light reflected from the surface, as well as of the light transmitted through the walls of the device, where the device is translucent and illuminated from its interior or from the rear, is indicated sufficiently for the purposes of this application.

In Figure 2 is shown a further specific application of my invention. In that figure I show a bust, and this may be hollow or may be in relief or even flat.

In Figure 3 I have illustrated the structural details of one embodiment of my invention and the method of its production. In that figure, 10 represents a portion of a hollow mold the inside surface of which is intended to be used as a matrix for the production of a display device. In this figure the numeral 12 indicates a sheet of crinkled material that is superposed on the inner surface of the mold 10; and 14 indicates a backing layer of any suitable or preferred material united thereto. As an example of material suitable for such back, I may mention strips of paper soaked in a glue solution and superimposed on the crinkled layer 12 while moist. It will be observed that the crinkled material receives its final shape at once; it is not necessary first to form a relatively rigid backing of the desired shape and then to superimpose the crinkled material thereon.

The material of the crinkled layer 12 may be light-transmitting or opaque. In the latter case I have found metallic foil to give an attractive appearance; while, if a translucent effect is desired, I have found regenerated cellulose such as "cellophane" suitable for that purpose. Where the layer 12 is light-transmitting, the backing layer 14 may itself be transparent or translucent, or may have ornamental characteristics which are visible through the outer layer. The cement uniting the layers 12 and 14 should be selected with a view to the particular effect desired. For example, it may be opaque or translucent, colored or colorless.

In Figure 4 I have shown the structural details of a further embodiment of my invention and have illustrated the method of producing it. In this figure 20 represents a portion of a hollow mold on the inside surface of which a light-transmitting layer 22 is placed. In this construction, the layer 22 is relatively smooth and uncrinkled and may, for example, be composed of a sheet or sheets of uncrinkled Cellophane or the like. Superposed on this layer is a layer of crinkled material 24, and the two layers may be joined by any suitable or preferred means, such as cementing them together by glue or cement; such cement or glue, of course, being preferably transparent or at least of such character as will not detract from the ornamental appearance of the display device.

A backing layer 26 is applied to the inside surface of the crinkled layer 24 and this, like the layer 14 of Figure 3, may be either transparent or opaque; if the latter, it may consist of paper strips soaked in glue solution; or, if transparent, it may consist of strips or sheets of Cellophane cemented to the layer 24 in any suitable or preferred manner to produce the effect desired.

In Figure 5 I have indicated a vase-like article having the walls thereof constructed in the manner heretofore described, but incorporating certain additional ornamental features such as the flower 32 and the leaf 34.

The details of the construction needed to produce the effects shown in Figure 5 will be better understood by a consideration of Figures 6, 7, and 8. It will further be understood that the method for arriving at such construction may be similar to that shown in Figures 3 and 4.

In Figure 6 I have shown a plain light-transmitting layer 40 having joined to its inner surface a crinkled layer 42 to which is joined the inner backing layer 44. The layer 42 may be translucent, in which case the backing layer 44 should be of attractive appearance; or the layer 42 may be opaque, in which case the layer 44 serves merely the function of reinforcement.

Superimposed on the outer transparent layer 40 are shown pieces 46 and 48 of limited area, and these may have ornamental configurations like the flower 32 or the leaf 34 of Figure 5, and may be opaque or translucent according to the effect desired. Where it is desired to illuminate the article from the interior, all of the layers including the ornaments 46 and 48 may be made translucent or, again, all the layers except the ornaments 46 and 48 may be made translucent, in which case the ornaments produce a silhouette effect. Where the effect is to be produced by reflection from the outside, the backing 44 may be opaque and the crinkled layer 42 may also be made opaque. The layer 40, of course, should be transparent; and the ornaments 46 and 48 may be either opaque or translucent.

In Figure 7 I have shown ornaments 56 and 58 applied behind the crinkled layer 50 which, obviously, should be translucent in order that the ornaments 56 and 58 be visible; while at the back of the ornaments 56 and 58 is the inner layer 54 which may be transparent or opaque according to the effect desired. The same is true of the ornaments 56 and 58.

Another variation of the same idea is to be found in Figure 8, in which the ornaments 66 and 68 are mounted between an outer plain layer 60 and an inner crinkled layer 64. Here, again, the outer layer should be translucent while the ornaments and the inner layer may be translucent or not, as desired.

In Figure 9 I have shown a section through a material that may be used for the production of articles of various configurations; and it will be observed that while in the method of manufacture disclosed in connection with Figures 3 and 4 the layers are individually applied to the mold, in utilizing the material shown in Figure 9 the various layers are initially assembled and then formed as desired. In this figure, 70 indicates a sheet of crinkled material, while 72 and 74 indicate relatively smooth sheets cemented thereto and protecting and supporting the crinkled material, and at least one of which obviously should be translucent to render the crinkled material visible.

The variations to which my invention is susceptible will be obvious to those skilled in the art. For example, in a construction of the character illustrated in Figure 4, a brilliant type of attention-arresting ornament may be produced by making all of the layers of regenerated cellulose or its equivalent. Or, in such a structure, if the intermediate crinkled layer is of colored Cellophane or of similar colored translucent material, a striking effect is produced, particularly where a source of illumination is arranged either behind or in the interior of the device. Under certain circumstances, the coloration of one or another layer may vary from area to area and in this way many attractive effects may be produced.

It will be understood that the invention is by no means restricted to a display device that is intended to support articles of merchandise. An ornament of the character described in Figure 5 might, for example, find utility in a show window display or the like even though no commodities are accommodated in or on it.

In general, it will be understood that changes in the details, herein described and illustrated for the purpose of explaining the nature of my invention, may be made by those skilled in the art without departing from the spirit and scope of the invention as expressed in the appended claims. It is, therefore, intended that these details be interpreted as illustrative and not in a limiting sense.

Having thus described my invention, and illustrated its use, what I claim as new and desire to secure by Letters Patent is—

1. A self-supporting hollow ornamental display device composed of a laminated wall whose outer surface is contoured into conformity with the inner surface of a hollow mold, said wall comprising an exteriorly visible layer of irregularly crinkled sheet material, and a rear reinforcing layer of overlapping glue-soaked paper patches.

2. A self-supporting hollow ornamental display device composed of a laminated wall whose outer surface is contoured into conformity with the inner surface of a hollow mold, said wall comprising an outer layer of relatively smooth light-transmitting sheet material, a layer visible through said smooth layer and comprising irregularly crinkled sheet material, and a rear reinforcing layer of overlapping glue-soaked paper patches.

3. A self-supporting hollow ornamental display device composed of a laminated wall whose outer surface is contoured into conformity with the inner surface of a hollow mold, said wall comprising an exteriorly visible layer of irregularly crinkled sheet material, a rear reinforcing layer of overlapping glue-soaked paper patches, and at least one configured element of relatively smooth, relatively opaque sheet material of contrasting coloration arranged on the outside of said crinkled layer.

4. A self-supporting hollow ornamental display device composed of a laminated wall whose outer surface is contoured into conformity with the inner surface of a hollow mold, said wall comprising an exteriorly visible layer of irregularly crinkled sheet material, a rear reinforcing layer of overlapping glue-soaked paper patches, and at least one configured element of relatively smooth, relatively opaque sheet material of contrasting coloration arranged between said crinkled layer and said reinforcing layer, said crinkled layer being of light-transmitting character to render said configured element visible from the outside.

5. A self-supporting hollow ornamental display device composed of a laminated wall whose outer surface is contoured into conformity with the inner surface of a hollow mold, said wall comprising an outer layer of relatively smooth light-transmitting sheet material, a layer visible through said smooth layer and comprising irregularly crinkled sheet material, a rear reinforcing layer of overlapping glue-soaked paper patches, and at least one configured element of relatively smooth, relatively opaque sheet material of contrasting coloration arranged between said crinkled layer and said light-transmitting outer layer.

LILLIAN L. GRENEKER.